G. A. JONES.
REVERSIBLE DRIVE CHAIN LINK.
APPLICATION FILED MAR. 20, 1913.
1,165,263.
Patented Dec. 21, 1915.
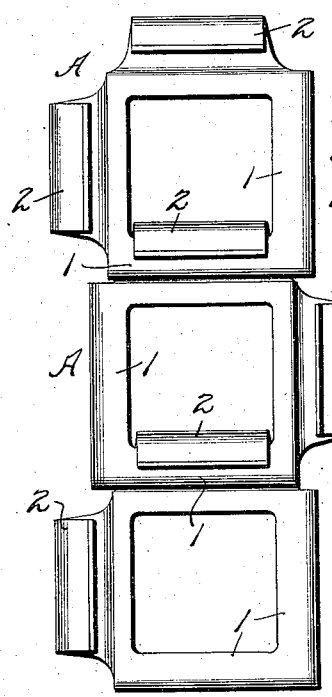
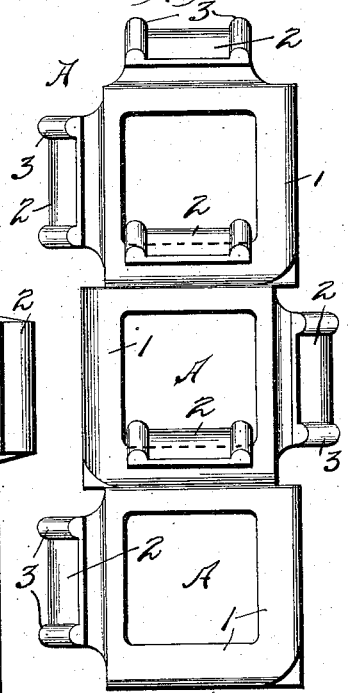
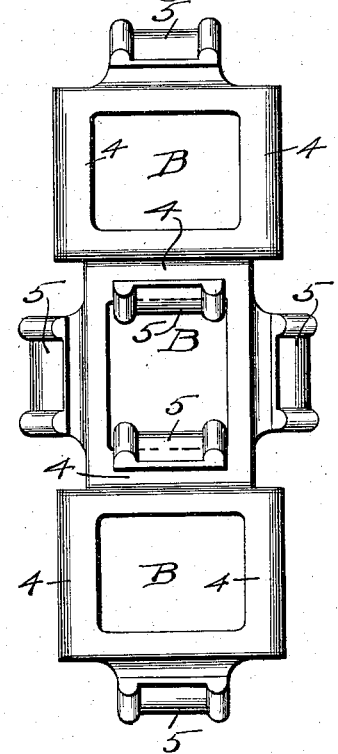
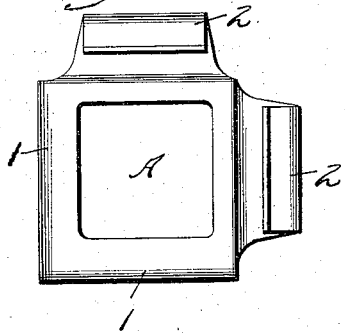
Inventor
George A. Jones,
Witnesses
By
his Attorney
COLUMBIA PLANOGRAPH CO., WASHINGTON, D. C.

UNITED STATES PATENT OFFICE.

GEORGE A. JONES, OF NORTHUMBERLAND, PENNSYLVANIA.

REVERSIBLE DRIVE-CHAIN LINK.

1,165,263.   Specification of Letters Patent.   Patented Dec. 21, 1915.

Application filed March 20, 1913. Serial No. 755,768.

*To all whom it may concern:*

Be it known that I, GEORGE A. JONES, a citizen of the United States, residing at Northumberland, in the county of Northumberland and State of Pennsylvania, have invented certain new and useful Improvements in Reversible Drive-Chain Links, of which the following is a specification.

The present invention relates to a reversible link for link chain building, and has for its object to provide a link of this character which embodies novel features of construction whereby the link may be assembled in different positions so as to present different parts for coupling, thereby prolonging the life of the chain and reducing repairs to a minimum.

A further object of the invention is to provide a reversible chain link of this character which is simple and inexpensive in its construction, which can be readily removed from the chain and again applied thereto in a different relation so as to present fresh and unworn parts for coupling, and which can be easily and quickly placed in position or removed therefrom as may be required.

A still further object of the invention is to provide a chain belting which is formed of reversible and interchangeable links and which will be specially useful in connection with conveyers of all kinds, dredges, and other similar machinery in which the chain belt is subjected to heavy wear such as necessitates frequent repair and replacing of the links.

With these and other objects in view which will be apparent to those familiar with the art, the invention consists in the novel construction, combination, and arrangement of parts hereinafter more fully described, illustrated, and claimed.

A few practical embodiments of the invention are suggested in the accompanying drawings, in which—

Figure 1 is a plan view of a series of reversible links which have been properly assembled to provide a portion of a chain. Fig. 2 is a detached view of one of the individual chain links. Fig. 3 is a view similar to Fig. 1, showing a slight modification of the invention. Fig. 4 is a similar view showing a still further modification of the invention.

Specifically describing the embodiment of the invention shown by Figs. 1 and 2 of the drawings, the characters A designate the individual links as an entirety, the various links being shown in Fig. 2 as assembled to form a chain section. Each of these links comprises a polygonal body portion, a portion of the sides of the polygonal body portion forming pintles 1, while other sides of the polygonal body portion are formed with knuckle hooks 2. The links A are preferably rectangular in shape, and in this embodiment of the invention, the pintles 1 and knuckle hooks 2 are oppositely disposed, there being a pintle 1 directly opposite each of the knuckle hooks 2.

In assembling the various links A to provide a chain section, one of the knuckle hooks 2 of each of the links A is brought into engagement with the pintle 1 of an adjacent link, the pintle 1 of the first mentioned link opposite the said knuckle hook being adapted to be brought into engagement with a knuckle hook of the other adjacent chain link. The chain may then be used in the usual manner until the coupling parts thereof become worn. Instead of replacing the worn link with an entirely new link, as is usually necessary, the worn link may be merely removed from the chain and again applied thereto in a different relation so as to present for coupling fresh and unworn parts. The previously unused pintle 1 and knuckle hook 2 would be placed in operative position, the worn members assuming an inoperative position.

A slight modification is shown in Fig. 3 of the drawings, in which the knuckle hooks 2 are provided at the ends thereof with the reinforcing ribs 3. The individual links A however have the same general construction, being rectangular in shape, two adjacent sides thereof providing pintles 1, while the remaining sides are provided with knuckle hooks 2. The various links are assembled in the same manner, and the position of the individual links may be shifted at any time to relieve the worn parts from service and present fresh and unworn parts for coupling.

A still further modification is shown in Fig. 4, in which the individual links B have a rectangular or polygonal formation, a portion of the sides of each link being constructed to form pintles 4, while other sides are formed with the knuckle hooks 5. The pintles 4 and knuckle hooks 5 are arranged in oppositely disposed pairs, and where the links B have the rectangular shape, as shown, there is one oppositely disposed pair of pintles 4 and one oppositely disposed pair of knuckle hooks 5. In assembling the individual links B to provide a chain section, the knuckle hooks 5 of alternate links are brought into engagement with the pintles 4 of the intermediate links, the adjacent links having the corresponding axes thereof disposed at substantially right angles to each other. When the coupling elements of the chain become worn, it is merely necessary to disconnect the various links B and to reverse the positions thereof so as to bring the fresh and unworn pintles 4 and knuckle hooks 5 into a coupling relation.

I claim:

1. A drive chain comprising a plurality of individual and separable rectangular link elements, each having any two sides thereof constituting pintle members, while the other sides are provided with knuckle hooks for detachably engaging and receiving the pintle members of adjoining links, said links being interchangeable and replaceable to effect the coupling of different pintle members and knuckle hooks to present fresh unworn parts.

2. A removable and reversible link for drive chains, comprising a polygonal body portion, any two sides of said polygonal body portion forming pintle members, while the other sides are provided with knuckle hooks, different knuckle hooks and pintle members being adapted to be presented for coupling with adjacent links by shifting the position of the link.

In testimony whereof I hereunto affix my signature in the presence of two witnesses.

GEORGE A. JONES.

Witnesses:
HELEN K. CONNOR,
CHAS. G. JESSUP.

Copies of this patent may be obtained for five cents each, by addressing the "Commissioner of Patents, Washington, D. C."